United States Patent [19]

Charlton et al.

[11] 4,094,753

[45] June 13, 1978

[54] RECOVERY OF GALLIUM FROM GALLIUM COMPOUNDS

[75] Inventors: Thomas L. Charlton, Rossland; Robert F. Redden, Fruitvale, Canada

[73] Assignee: Cominco Ltd., Vancouver, Canada

[21] Appl. No.: 802,405

[22] Filed: Jun. 1, 1977

[51] Int. Cl.$^2$ ............................. C25C 1/00; C01F 1/00
[52] U.S. Cl. ................................ 204/105 R; 423/122; 423/132
[58] Field of Search ................... 204/105 R; 423/122, 423/127, 132, 131

[56] References Cited

U.S. PATENT DOCUMENTS

| | | | |
|---|---|---|---|
| 2,582,378 | 1/1952 | Brown | 204/105 R |
| 3,890,427 | 6/1975 | Dewey et al. | 423/131 |
| 3,904,497 | 9/1975 | Sleppy et al. | 204/105 R |

*Primary Examiner*—T. M. Tufariello
*Attorney, Agent, or Firm*—Arne I. Fors

[57] ABSTRACT

A process is described for the recovery of gallium from scrap materials in which the gallium occurs as gallium compounds containing at least one element selected from the group consisting of aluminum, antimony, arsenic and phosphorus. The process comprises the steps of leaching said gallium compounds with an oxidizing agent selected from nitric acid and a combination of nitric acid and hydrogen peroxide to form a gallium-containing leach solution, forming a gallate solution from said gallium-containing solution, and recovering gallium from said gallate solution. The leach solution can be treated with a calcium compound chosen from the group consisting of lime and calcium hydroxide for precipitation of calcium arsenate and calcium phosphate. An alkaline material such as sodium hydroxide may then be added to said leach solution in an amount sufficient to raise the pH to a value of at least 11 to form gallate solution. Gallium metal preferably is recovered from said gallate solution by electrolysis.

25 Claims, No Drawings

RECOVERY OF GALLIUM FROM GALLIUM COMPOUNDS

BACKGROUND OF THE INVENTION

This invention relates to a process for the recovery of gallium and, more particularly, to a process for the recovery of gallium from gallium compounds contained in scrap materials.

Gallium finds extensive application in the electronics industry in compounds generally known as III-V compounds. The manufactures of electronic devices process large quantities of these compounds and thereby generate amounts of scrap and the like waste materials. It has been found economically attractive to recover the valuable gallium contained in these materials for the purpose of reprocessing it.

Several processes have been disclosed for the recovery of gallium from gallium containing III-V compounds. According to U.S. Pat. No. 3,904,497, which issued on Sept. 9, 1975, gallium metal is electrolytically extracted from gallium compounds wherein the gallium compound is established as a dissolvable anode and gallium is plated out on an inert cathode. The arsenate content of the electrolyte, in the extraction of gallium from GaAs, is controlled by removal of a portion of the electrolyte and treatment of that portion to precipitate arsenate. According to Japanese Kokai No. 75 84410 and No. 75 84613, which were published on July 8, 1975 (cf. Chemical Abstracts 84, 93262j and 109028a), a gallium compound or mixture containing group VA elements is decomposed in an alkaline solution of hydrogen peroxide and the resulting solution is electrolyzed to recover gallium. These processes have several disadvantages. The electrolytic process is useful for treating relatively pure III-V compounds-containing materials but is impractical for the treatment of scrap materials which contain substantial amounts of compounds other than III-V compounds. Excessive amounts of reagents and extremely long retention times are required, viz., the examples which show that 2150 weight parts of $H_2O_2$ are used per 100 weight parts of GaAs and retention times are 15 hours.

STATEMENT OF THE INVENTION

It has now been discovered that these disadvantages can be alleviated. Accordingly, there is provided a process for the recovery of gallium from gallium compounds containing at least one element selected from the group consisting of antimony, arsenic and phosphorus by the steps of leaching said gallium compounds with an oxidizing agent, chosen from nitric acid and a combination of nitric acid and hydrogen peroxide, in an amount at least sufficient to dissolve said gallium to form a gallium-containing solution, forming a gallate solution from said gallium-containing solution and recovering gallium from said gallate solution. Said gallium compounds can additionally contain aluminum.

DESCRIPTION OF THE PREFERRED EMBODIMENTS

Materials containing gallium compounds that may be treated by the process of the invention are scrap and waste materials in the form of broken wafers, chips, substrate materials, powders, dust and sludges, the latter three obtained from metal working processes such as grinding, sawing or lapping. These materials not only contain appreciable amounts of valuable gallium as III-V compounds such as GaAs, GaP, GaSb, GaAsP, GaAlAs and GaAlP, but may often contain major amounts of other compounds such as alumina or silica, which originate from abrasives used in the metal working processes, as well as minor amounts of other metals or metal compounds which may originate from doped materials or substrates. Scrap materials containing the named III-V compounds which have been treated for the removal of a portion of the group V elements may also be treated.

The above materials are treated with an oxidizing agent in solution to dissolve gallium from the materials in an aqueous leach solution leaving a leach residue. Suitable oxidizing agents are nitric acid and a combination of nitric acid and hydrogen peroxide. The treatment is carried out in a leach with sufficient oxidizing agent to react with all elements contained in the gallium compounds that are present in the material being treated. Thus, gallium, arsenic, phosphorus and aluminum are dissolved in leach solution, while antimony forms insoluble antimony oxide. Antimony oxide and substantially inert materials such as alumina and silica form leach residue. Some other metal compounds, such as those derived from doping of compounds, abrasives and substrates, may dissolve completely or in part, or may remain in the leach residue.

In a leach with nitric acid, materials to be treated and nitric acid are fed to a leach vessel and the reaction mixture is heated to an elevated temperature and maintained at that temperature for the required retention time. The materials may be slurried with water prior to feeding to the leach vessel. The nitric acid may be added as a concentrated or diluted solution. The amount of nitric acid added is in excess of the amount necessary to dissolve the gallium. Preferably the amount of nitric acid is in excess, for example, 10% in excess, of the stoichiometric amount required to react with the gallium compounds in the materials. During the leaching reaction nitrogen oxide gases are formed so that good ventilation of the leach vessel is required.

To prevent excessive foaming of the reaction mixture the nitric acid may be added slowly; alternatively slurried materials are added to a nitric acid solution in the leach vessel, whereby foaming is controlled. The temperature of the leach is maintained in the range of 60° to 100° C., preferably at about 80° C. The retention time for completion of the leach is in the range of 2 to 4 hours.

In a leach carried out with a combination of nitric acid and hydrogen peroxide, exothermic reactions occur which may be represented, for example, for GaAs, by the following reaction equation:

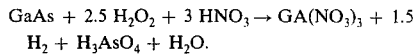

Similar reactions take place with other gallium compounds, aluminum forming a nitrate and phosphorus forming phosphoric acid, while antimony forms insoluble antimony oxide.

Hydrogen peroxide is added to the leach vessel, for example, as a 30% solution. Both hydrogen peroxide and nitric acid are used in substantially stoichiometric amounts with respect to soluble constituents in the material, preferably with respect to the gallium compounds contained in the material. The required amount of hydrogen peroxide is preferably added to the leach vessel in a gradual manner, i.e. added slowly or intermittently over a period of time, following the addition, at room temperature, of slurried materials to the nitric acid solution. Due to the exothermic nature of the reactions, the temperature of the reaction mixture rises during the addition of the peroxide and only a limited heating of the reaction mixture is required to bring the temperature to and maintain the temperature at its desired value. The temperature is maintained in the range of 60° to 100° C, preferably at 80° C. The reactions are substantially completed in one hour or less.

The presence of hydrogen peroxide in the leach results in a number of important advantages. No excess of reagents is required, no nitrogen oxides are evolved so that ventilation requirements are reduced, the reactions are very fast so that retention times are reduced, the reactions are exothermic resulting in reduced energy requirements, and very little foaming occurs.

After completion of the leach, the reaction mixture is discharged from the reaction vessel and submitted to a solids-liquid separation, such as, for example, filtration whereby leach residue and leach solution are obtained. Leach residue is washed and the washed residue, which typically contains less than 0.1% gallium, may be discarded. Leach solution is treated for recovery of gallium.

Leach solution may be treated with an amount of sodium hydroxide sufficient to raise the pH to a value of at least 11 to form a gallate solution. The sodium gallate solution is further treated for the recovery of gallium, for example, by electrolysis carried out according to conventional practice, yielding gallium metal.

The gallate solution may be treated prior to electrolysis with a calcium compound for the precipitation of at least one compound of the group consisting of calcium arsenate and calcium phosphate. The amount of calcium compound used, such as lime or calcium hydroxide, is at least sufficient to precipitate the arsenate and/or phosphate. The precipitation is carried out at a temperature in the range of 60° to 100° C, preferably at about 80° C, under agitation. After a solids-liquid separation, the remaining gallate solution is treated for recovery of gallium, such as, for example, by electrolysis.

Leach solution preferably is treated in a precipitation and redissolution step with a calcium compound for the formation of a reaction slurry which contains a precipitate comprising at least one compound of the group consisting of calcium arsenate and calcium phosphate. Thus, leach solution is treated with an amount of lime or calcium hydroxide to form a reaction slurry comprising precipitate of calcium arsenate and/or calcium phosphate, dependent on the presence of arsenic and/or phosphorus in the gallium compounds, as well as some coprecipitated gallium and aluminum compounds. The amount of lime or calcium hydroxide is at least stoichiometric to the arsenate and/or phosphate content of the leach solution. Lime preferably is added as a water slurry. The reaction slurry is agitated for a period of about one hour and the temperature is maintained in the range of 60° to 100° C, preferably at about 80° C.

After a period required for the precipitation of calcium arsenate and/or calcium phosphate, an amount of a suitable alkaline material such as, for example, sodium hydroxide, is added to the reaction slurry to redissolve coprecipitated gallium and aluminum compounds from the precipitate. Alkaline material is added in an amount sufficient to raise the pH to and maintain the pH at a value of at least 11. Agitating the reaction slurry with the required amount of alkaline material for a second period of at least one hour dissolves substantially all gallium and aluminum. A residual precipitate of calcium arsenate and calcium phosphate remains.

The reaction slurry is discharged from the precipitation and redissolution step and subjected to a solids-liquid separation such as filtration. The solids fraction, comprising the residual precipitate, is washed and may be discarded. The liquid fraction, which may contain sodium aluminate, is a sodium gallate solution which is treated for the recovery of gallium by, for example, electrolysis.

The sodium gallate solution as obtained by any of the above described methods may be purified prior to electrolysis by neutralizing the solution with acid for the precipitation of gallium as gallium hydroxide. Sulfuric acid, for example, of 93% strength, preferably is added in an amount sufficient to lower the pH to a value of about 6. A pH of about 6 represents the point at which the gallium precipitate reaches its minimum solubility. The precipitation is carried out at a temperature in the range of 60° to 100° C and for a time of sufficient duration to obtain a precipitate that can be easily separated from solution. After separation of precipitate from solution, the precipitate is washed and redissolved in sodium hydroxide solution. The resulting purified gallate solution is subjected to electrolysis for the recovery of gallium.

If desired, aluminium may be removed from the gallate solution prior to its purification. The aluminum in the solution is precipitated as calcium aluminate by adding at least a stoichiometric amount of a suitable calcium compound, preferably in the form of a slurry of lime or calcium hydroxide. The temperature is maintained in the range of 60° to 100° C. The solution and added calcium compound are agitated for a period of time sufficient to complete the precipitation of calcium aluminate, usually for at least two hours. After removal of the precipitated aluminate, the solution may then be subjected to purification, as described.

The gallium which is recovered from the electrolysis may be further purified, if so desired.

As an alternative method for the recovery of gallium by electrolysis, sodium gallate solution obtained according to any of the above described methods may be treated with sulfuric acid according to the above described procedure for purification. The washed precipitate is recovered as a gallium concentrate.

The process will now be illustrated by means of the following non-limitative examples. In the examples, all percentages are given as percentages by weight. Example 1

This example illustrates that a good separation of Ga from As contained in GaAs can be obtained when GaAs is leached in nitric acid.

100 g of GaAs saw sludge containing 12.1% Ga, 12.1% As, 59.5% $SiO_2$, 3% Al, 5% Ca, 1% Fe and 2% Na, as well as minor quantities of several other elements, was slurried in 250 ml water and treated with 60 ml concentrated $HNO_3$, a 30% excess. The nitric acid was added in small portions to the slurry of GaAs. The mixture was heated to a temperature of 80° C, agitated for a period of 4 hours and filtered. The filtercake was washed with two portions of 200 ml water. The filtercake was dried and the dry weight of the residue was 69.8 g. The residue contained 0.021% Ga, 0.2% As and the remainder $SiO_2$.

The leach solution contained 13.6 g/l Ga, 14.5 g/l As and 0.145 g/l $SiO_2$.

The $HNO_3$ leach solution was treated with NaOH to raise the pH to a value of 12. The solution was heated to 80° C and a slurry of $Ca(OH)_2$ was added. The amount of $Ca(OH)_2$ added was twice the stoichiometric amount required to precipitate calcium arsenate. The slurry was agitated for one hour and filtered. The residue was repulped with water and refiltered. The residue was mainly calcium arsenate and contained 0.4% Ga. The filtrate contained 0.061 g/l As and a calculated gallium content of 13.4 g/l Ga. The recovery of gallium from the saw sludge, after separation from arsenic, was 98%.

Examples 2 – 5 following illustrate improvements over the method illustrated in Example 1 in that less reagents are used and the recovery of gallium is improved.

EXAMPLE 2

To a solution of 150 ml of 70% $NHO_3$ in 2 l of water at 80° C was added GaAs saw sludge containing 12.1% Ga and 12.15% As at a rate that kept the frothing at a controllable level. When the $HNO_3$ had been consumed, as evidenced by the darkening of the reaction slurry due to unreacted GaAs, an additional 150 ml of 70% $HNO_3$ was added to the slurry and saw sludge addition was continued. This process was repeated over a period of 75 minutes until 990 g of saw sludge and 450 ml of 70% $HNO_3$ had been added.

The reaction slurry was stirred for an additional 15 minutes, then filtered leaving a residue which after washing weighed 685 g and contained 0.17% Ga and 0.18% As. This represents about 99% extraction of the Ga in the saw sludge. The calculated concentrations in leach solution (3 l) were 39.5 g/l Ga and 39.7 g/l As.

EXAMPLE 3

A slurry of 40 g $Ca(OH)_2$ in 100 ml water was added to 1 l of a leach solution at room temperature containing 24.0 g/l Ga and 26.8 g/l As obtained from a nitric acid leach using the procedure described in Example 2. This amount of calcium was stoichiometric for the precipitation of $Ca_3(AsO_4)_2$. Some foaming occurred which was readily controlled with an anti-foaming agent. The lime-containing slurry was stirred for 30 minutes and then 120 g NaOH were added to raise the pH to 11.5. The slurry temperature was raised to 80° C and agitation was continued for one hour. The slurry was filtered and the residue was washed by repulping in water and refiltering. The total filtrate (2200 ml) contained 12.0 g/l Ga and 0.37 g/l As. The residue weighed 89.4 g and contained 2.3% Ga.

This Example and Example 1 indicate that there is wide latitude in the amount of calcium compound that can be added to precipitate the As, and that the order in which the lime and caustic are added is not critical.

EXAMPLE 4

1000 g solids, obtained by treating GaAs with nitric acid, removing arsenate from the leach solution and precipitating gallium with sulfuric acid, were treated. The solids, containing 65% moisture and composed of 48.4% Ga and 3.6% As on a dry basis, were slurried in 1000 ml $H_2O$ and treated with 125 g NaOH at 75° C for 3 hours. The mixture was filtered and the residue displacement washed with hot water. 170 g residue (on a dry basis) were obtained containing 37.4% Ga. Thus, 106 g Ga in the concentrate were solubilized. 137 g of the undissolved residue (containing 51 g Ga) were reslurried in 700 ml $H_2O$ and treated with 50 g NaOH for 1 hour at 75° C. The slurry was filtered, and the residue was displacement washed with hot water. 67 g of final residue (dry basis) were obtained containing 14.2% Ga, i.e. about 41.5 g of Ga were solubilized.

A portion of the filtrate and washings (1.9 l) containing the 106 g Ga were electrolyzed. 600 ml were placed in a test cell with stainless steel anodes and Invar (Trade Mark) cathodes. Attempts at electrolysis of this solution resulted in formation of $Fe(OH)_3$ on the anodes and little Ga plating. Cell resistance was very high. An additional 25 g of NaOH were added to the electrolyte and electrolysis was continued. In this example, cell resistance was low, no $Fe(OH)_3$ was formed, and Ga plated readily.

The original 600 ml electrolyte contained (by calculation) about 40 g NaOH and 33.5 g Ga for a $Na_2O:Ga_2O_3$ ratio of 0.7. After addition of 25 g NaOH this was increased to a $Na_2O:Ga_2O_3$ ratio of 1.2. A $Na_2O:Ga_2O_3$ ratio of greater than 1 is desirable for dissolution of the concentrate. Thus, a $Na_2O:Ga_2O_3$ ratio of 2 is not necessarily needed for electrolysis, but it is desirable for dissolution of the concentrate.

EXAMPLE 5

93 g final residue, similar to that in Example 4, containing 65.3% moisture and 14.2% Ga (dry basis) were treated with sulfuric acid. After filtering and washing, 13.9 g (dry basis) residue were obtained containing 0.78% Ga. The filtrates were treated with NaOH to raise the pH to 13 and an additional 7.6 g residue (dry basis) was obtained which contained only 2% Ga. This treatment serves to remove further undesirable impurity metals, such as iron, from electrolyte.

EXAMPLE 6

This example illustrates the recovery of gallium from gallium compounds containing materials using a combination of nitric acid and hydrogen peroxide as oxidizing agent.

The analysis of the treated materials in percentages was as follows:

| Ga | As | P(as $P_2O_5$) | Si | Ba | Ca | Cr | Cu | Fe |
|---|---|---|---|---|---|---|---|---|
| 5.0 | 4.4 | 0.12 | 1.0 | 0.03 | 0.1 | 0.05 | 0.002 | 0.5 |
| Mg | Mn | Ni | Sr | Sn | Ti | Zr | Al | |
| 0.4 | 0.1 | 0.01 | 0.02 | 0.005 | 0.4 | 0.2 | 85 | |

2000 g dry materials were slurried in 5 l water and the slurry added to 275 ml concentrated nitric acid. 375 ml of a 30% hydrogen peroxide solution were slowly added. After addition of 300 ml, gas evolution commenced and the temperature of the slurry mixture had risen to 65° C. After completion of the addition of hydrogen peroxide the slurry was heated to 80° C and maintained at this temperature for 30 minutes, after which the slurry was filtered.

130 g lime were slurried in 250 ml water and added to the leach solution. The resulting reaction slurry was heated to 80° C and agitated for one hour. Then 210 g sodium hydroxide were added to raise the pH to a value of 13. The reaction slurry was agitated for one hour at 80° C and filtered to give a reaction slurry residue and a reaction slurry filtrate.

The filtrate from the reaction slurry was reheated to 80° C and neutralized with sulfuric acid to a pH of 6.0.

The mixture was stirred for one hour at 80° C and allowed to settle. The supernatant liquid was decanted and the precipitate filtered.

The wet precipitate was treated with 70 g sodium hydroxide to give 400 ml of electrolyte which was electrolyzed at 0.05 A/cm$^2$ at a cell voltage of 4.5 V for a period of 10 hours.

The analyses and weight or volume of the various residues and filtrates are shown in Table I.

Table I

| Material | Weight or Volume | Analyses Ga | g of Ga | As |
|---|---|---|---|---|
| materials | 2000 g | 5.0% | 100 | 4.4% |
| leach residue | 1846 g | 0.05% | 0.9 | 0.1% |
| leach filtrate | 5.70 l | 15.5 g/l | 88.4 | 13.4 g/l |
| reaction slurry residue | 309 g | 2.0% | 6.2 | 27.0% |
| reaction slurry filtrate | 10.52 l | 6.7 g/l | 70.5 | 0.05 g/l |
| precipitate | 120.6 g | 54.8% | 66.1 | 0.1% |
| spent electrolyte | 0.37 l | 0.058 g/l | 0.02 | — |
| Ga metal | — | — | 55* | — |

*The gallium metal had a purity of 99.99%

In addition to the above described steps, the leach residue was displacement washed with 5 l water and the wash filtrate analyzed. Also, the reaction slurry residue was displacement washed with 5 l hot water and filtered, the filtercake was repulped in 1 l water containing 20 g sodium hydroxide, agitated for one hour at 80° C, then filtered and displacement washed with 0.5 l water. The final, washed, reaction slurry residue and the combined filtrates were analyzed. The data are presented in Table II.

Table II

| Material | Weight or Volume | Analyses Ga | g of Ga | As |
|---|---|---|---|---|
| wash filtrate | 4.6 l | 1.4 g/l | 6.4 | 1.2 g/l |
| final reaction slurry residue | 232 g | 0.78% | 1.8 | — |
| combined filtrates | 6.14 l | 0.03 g/l | 0.2 | 0.0002 g/l |

Due to the nature of the tests illustrated by this example and the large number of samples, the recovery of gallium metal from the materials was only 55%. However, when the real losses of gallium, which occur only in the solids residues and spent electrolyte, are used to calculate the recovery, recovery of gallium metal is 97%. Thus, gallium can be effectively separated from other materials with a high efficiency of recovery.

What I claim as new and desire to protect by Letters Patent of the U.S. is:

1. A process for the recovery of gallium from gallium compounds containing at least one element selected from the group consisting of antimony, arsenic and phosphorus which comprises the steps of:
   (i) leaching said gallium compounds with an oxidizing agent selected from nitric acid and a combination of nitric acid and hydrogen peroxide, said oxidizing agent being added in an amount at least sufficient to dissolve said gallium from said gallium compounds to form a gallium-containing solution;
   (ii) forming a gallate solution from said gallium-containing solution; and
   (iii) recovering gallium from said gallate solution.

2. A process as claimed in claim 1, in which said gallium compounds additionally contain aluminum.

3. A process as claimed in claim 1, in which said gallium compounds are one or more compounds chosen from the group consisting of GaAs, GaP, GaSb, GaAsP, GaAlAs and GaAlP.

4. A process as claimed in claim 1, wherein the leach is carried out at a temperature in the range of 60° to 100° C.

5. A process as claimed in claim 1, wherein the leach is carried out with a combination of nitric acid and hydrogen peroxide in an amount substantially stoichiometric to said gallium compounds.

6. A process as claimed in claim 1, wherein the leach is carried out with a combination of nitric acid and hydrogen peroxide and wherein hydrogen peroxide is gradually added to a mixture of nitric acid and said compounds.

7. A process as claimed in claim 1, wherein gallate solution is neutralized at a temperature in the range of 60° to 100° C with sulfuric acid in an amount sufficient to lower the pH to a value of about 6 whereby gallium precipitates as gallium hydroxide, the precipitate is separated from solution and recovered.

8. A process as claimed in claim 1, wherein gallate solution is neutralized at a temperature in the range of 60° to 100° C with sulfuric acid in an amount sufficient to lower the pH to a value of about 6 whereby gallium precipitates as gallium hydroxide, the precipitate is separated, the precipitate is redissolved in sodium hydroxide solution and the resulting gallate solution is electrolyzed for the recovery of gallium.

9. A process as claimed in claim 1, wherein said gallate solution is electrolyzed and gallium is recovered.

10. A process as claimed in claim 1, wherein a gallate solution is formed by adding sodium hydroxide to said gallium-containing solution in an amount sufficient to raise the pH to a value of at least 11, and gallium is recovered from said gallate solution by electrolysis.

11. A process as claimed in claim 1, wherein said gallate solution is treated with a calcium compound for the precipitation of at least one compound of the group consisting of calcium arsenate and calcium phosphate, the precipitate is removed and the remaining gallate solution is treated for the recovery of gallium.

12. A process for the recovery of gallium from materials comprising gallium compounds containing at least one element selected from the group consisting of arsenic and phosphorous which comprises the steps of:
   (i) leaching said materials with nitric acid in an amount in excess of the amount required to dissolve said gallium compounds for formation of leach residue and leach solution;
   (ii) separating leach residue and leach solution;
   (iii) treating leach solution with a calcium compound chosen from the group consisting of lime and calcium hydroxide for formation of a reaction slurry containing precipitate comprising at least one compound of the group consisting of calcium arsenate and calcium phosphate;
   (iv) adding sodium hydroxide to said reaction slurry in an amount sufficient to raise the pH to a value of at least 11, whereby gallate solution and residual precipitate are formed;
   (v) separating gallate solution from residual precipitate; and
   (vi) recovering gallium from said gallate solution.

13. A process as claimed in claim 12, wherein said group of elements additionally contains aluminum and antimony.

14. A process as claimed in claim 12, in which said gallium compounds are one or more compounds chosen from the group consisting of GaAs, GaP, GaSb, GaAsP, GaAlAs and GaAlP.

15. A process as claimed in claim 12, wherein the leach is carried out at a temperature of about 80° C.

16. A process as claimed in claim 12, wherein said treating with a calcium compound is carried out at a temperature in the range of 60° to 100° C.

17. A process as claimed in claim 12, wherein gallate solution is neutralized at a temperature in the range of 60° to 100° C with sulfuric acid in an amount sufficient to lower the pH to a value of about 6 whereby gallium precipitates as gallium hydroxide, the precipitate is separated from solution and recovered.

18. A process as claimed in claim 12, wherein gallate solution is neutralized at a temperature in the range of 60° to 100° C with sulfuric acid in an amount sufficient to lower the pH to a value of about 6 whereby gallium precipitates as gallium hydroxide, the precipitate is separated, the precipitate is redissolved in sodium hydroxide solution and the gallate solution is electrolyzed for the recovery of gallium.

19. A process for the recovery of gallium from materials comprising gallium compounds containing at least one element selected from the group consisting of arsenic and phosphorus which comprises the steps of:
(i) leaching said materials with a combination of nitric acid and hydrogen peroxide in amounts at least sufficient to dissolve said gallium compounds for formation of leach residue and leach solution;
(ii) separating leach residue and leach solution;
(iii) treating leach solution with a calcium compound chosen from the group consisting of lime and calcium hydroxide for formation of a reaction slurry containing precipitate comprising at least one compound of the group consisting of calcium arsenate and calcium phosphate;
(iv) adding sodium hydroxide to said reaction slurry in an amount sufficient to raise the pH to a value of at least 11 whereby gallate solution and residual precipitate are formed;
(v) separating gallate solution from residual precipitate; and
(vi) recovering gallium from said gallate solution.

20. A process as claimed in claim 19, said group of elements additionally containing aluminum and antimony.

21. A process as claimed in claim 19, in which said gallium compounds are one or more compounds chosen from the group consisting of GaAs, GaP, GaSb, GaAsP, GaAlAs and GaAlP.

22. A process as claimed in claim 19, wherein the leach is carried out at a temperature of about 80° C.

23. A process as claimed in claim 19, wherein said treating with a calcium compound is carried out at a temperature in the range of 60° to 100° C.

24. A process as claimed in claim 19, wherein gallate solution is neutralized at a temperature in the range of 60° to 100° C with sulfuric acid in an amount sufficient to lower the pH to a value of about 6 whereby gallium precipitates as gallium hydroxide, the precipitate is separated from solution and recovered.

25. A process as claimed in claim 19, wherein gallate solution is neutralized at a temperature in the range of 60° to 100° C with sulfuric acid in an amount sufficient to lower the pH to a value of about 6 whereby gallium precipitates as gallium hydroxide, the precipitate is separated, the precipitate is redissolved in sodium hydroxide solution and the gallate solution is electrolyzed for the recovery of gallium.

* * * * *